United States Patent
Alecu et al.

(10) Patent No.: US 9,938,855 B2
(45) Date of Patent: Apr. 10, 2018

(54) COOLING SYSTEM AND METHOD FOR SUPPLYING A COOLING GAS FLOW

(71) Applicant: PRATT & WHITNEY CANADA CORP., Longueuil (CA)

(72) Inventors: Daniel Alecu, Toronto (CA); Andreas Eleftheriou, Woodbridge (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 1084 days.

(21) Appl. No.: 14/169,354

(22) Filed: Jan. 31, 2014

(65) Prior Publication Data

US 2015/0218963 A1 Aug. 6, 2015

(51) Int. Cl.

| F01D 25/14 | (2006.01) |
|---|---|
| F02K 3/06 | (2006.01) |
| F02C 7/18 | (2006.01) |

(52) U.S. Cl.
CPC .............. *F01D 25/14* (2013.01); *F02C 7/18* (2013.01); *F02K 3/06* (2013.01); *F05D 2260/601* (2013.01)

(58) Field of Classification Search
CPC .......... F01D 25/14; F01D 25/08; F01D 25/12; F01D 25/24; F02K 3/06; F02C 7/18; F05D 2260/601
USPC ......... 415/52.1, 55.3, 55.4, 56.4, 56.5, 57.1, 415/58.4, 76, 108, 116
See application file for complete search history.

(56) References Cited

U.S. PATENT DOCUMENTS

| 2,591,676 | A | | 4/1952 | Clayton, Jr. |
| 3,885,891 | A | * | 5/1975 | Throndson ................ F04F 5/16 417/196 |
| 4,303,377 | A | | 12/1981 | Schwartzman |
| 4,342,200 | A | * | 8/1982 | Lowi, Jr. ............ B60H 1/00007 417/191 |
| 5,088,277 | A | | 2/1992 | Schulze |
| 5,224,819 | A | * | 7/1993 | Kernon ................... F01D 9/041 415/115 |
| RE36,215 | E | | 6/1999 | Rosenthal |
| 6,260,352 | B1 | | 7/2001 | Negulescu et al. |
| 6,282,881 | B1 | | 9/2001 | Beutin et al. |
| 6,578,351 | B1 | | 6/2003 | Modafferi |
| 6,615,576 | B2 | | 9/2003 | Sheoran et al. |
| 7,337,605 | B2 | | 3/2008 | Hagshenas |
| 8,245,494 | B2 | | 8/2012 | DeDe et al. |
| 8,276,392 | B2 | | 10/2012 | Van Der Woude |
| 8,505,310 | B2 | | 8/2013 | Zhang et al. |

(Continued)

*Primary Examiner* — Logan Kraft
*Assistant Examiner* — Danielle M Christensen
(74) *Attorney, Agent, or Firm* — Norton Rose Fulbright Canada LLP

(57) ABSTRACT

A turbine case cooling system and a method for supplying a cooling gas flow are provided. The cooling system has a turbine case and a turbine case cooling manifold. The cooling system also has a fluid or cooling conduit. The cooling conduit has an inlet in fluid communication with the bypass duct, and an outlet in fluid communication with the cooling manifold. The cooling conduit also has an ejector section which in use supplies a motive air flow radially into the cooling conduit to draw a bypass air flow from the bypass duct. The motive air flow mixes with the bypass air flow to form the cooling gas flow. The cooling conduit also has a diffuser section which in use conveys the cooling gas flow toward the outlet in a direction substantially perpendicular to the center axis of the gas turbine engine.

16 Claims, 5 Drawing Sheets

(56) References Cited

U.S. PATENT DOCUMENTS

2002/0005038 A1* 1/2002 Boeck .................... B64D 33/08
60/204
2009/0314004 A1 12/2009 Van Der Woude
2011/0138819 A1* 6/2011 Tanimura ................ F01D 25/30
60/796
2012/0325354 A1* 12/2012 Janetzke ................. F01D 25/12
137/808

* cited by examiner

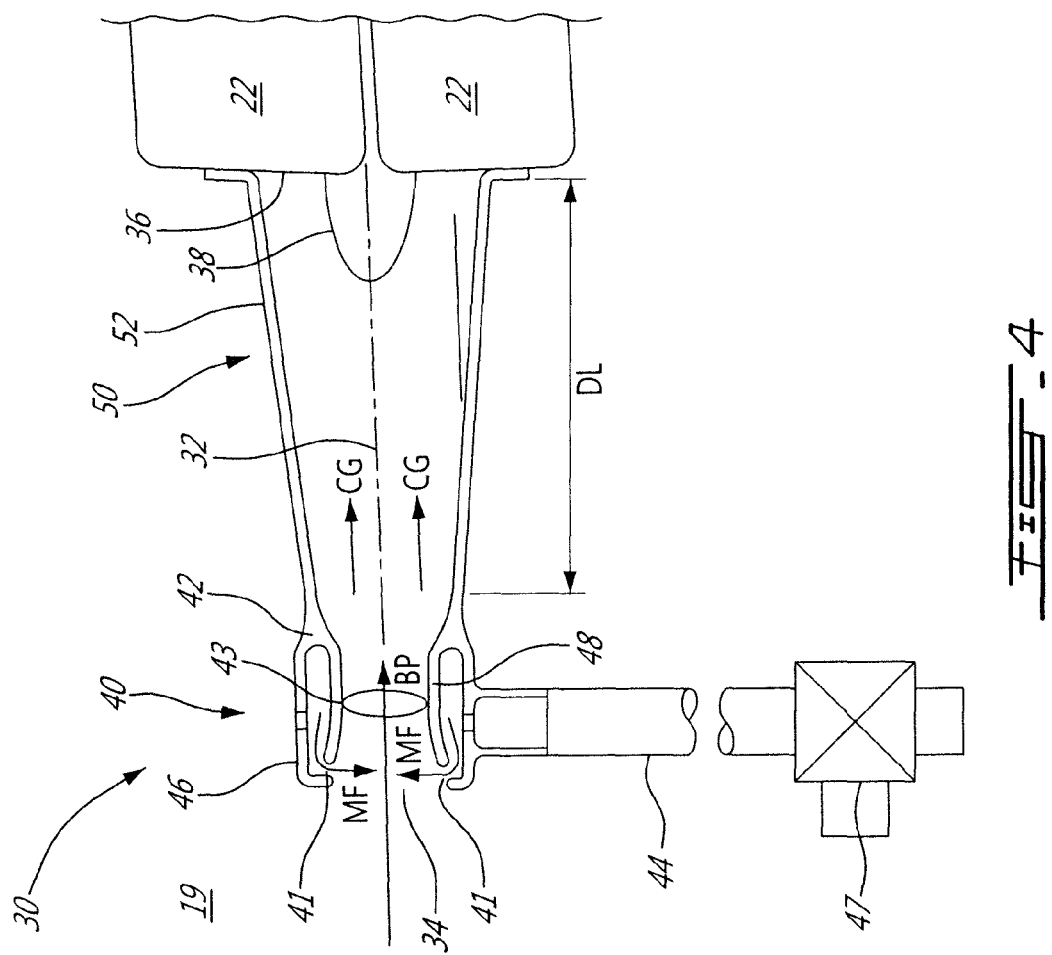

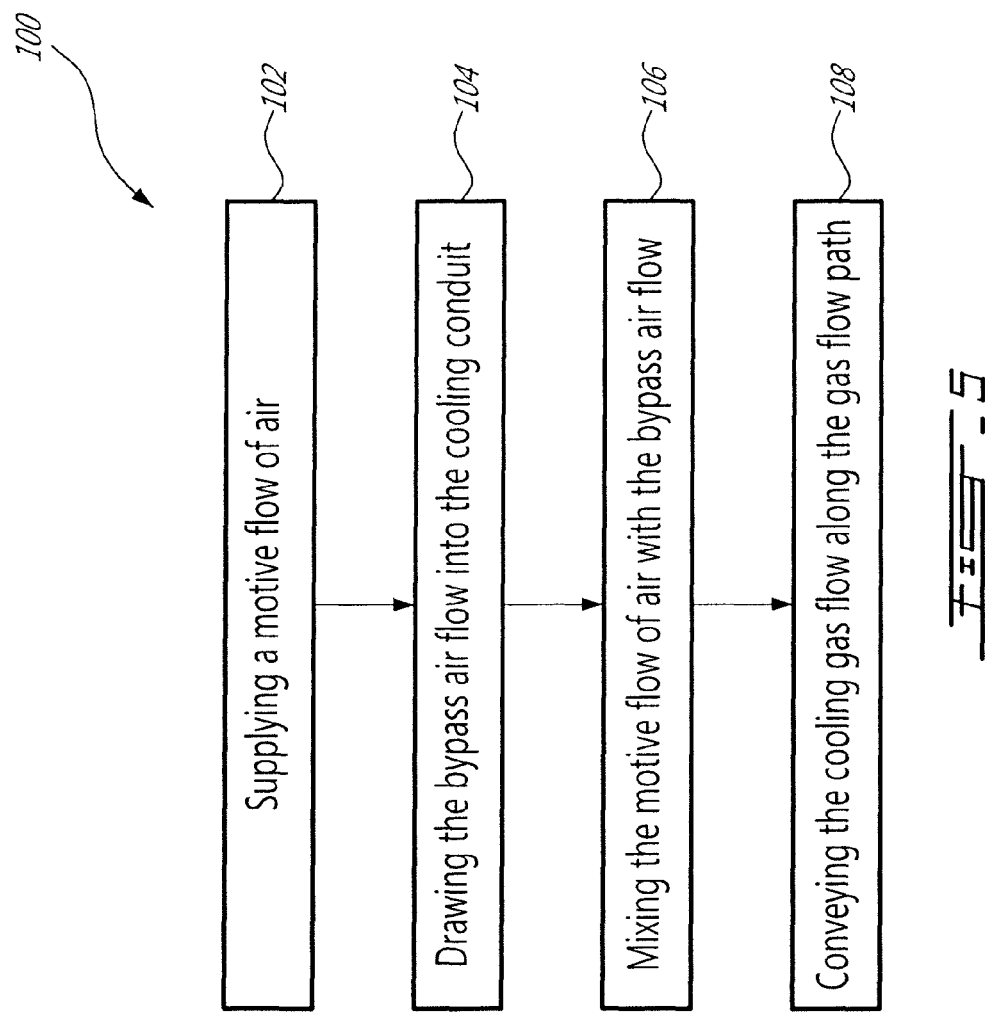

COOLING SYSTEM AND METHOD FOR SUPPLYING A COOLING GAS FLOW

TECHNICAL FIELD

The application relates generally to fluid conduits and, more particularly, to a cooling system and a method for supplying a cooling gas flow.

BACKGROUND OF THE ART

Relatively cool air is supplied to components of a gas turbine engine so as to regulate the temperature of these components and to maintain an optimum operation of the engine. For example, it is known to provide relatively cool air for cooling the turbine cases which enclose the turbine stages of the gas turbine engine.

One of the disadvantages associated with conventional techniques for cooling the turbine cases is that the pipe carrying the lower-pressure cool air often requires a relatively large pipe diameter, a relatively large valve size, and a relatively long routing with multiple bends. These bends may create perturbations in the main gas path flow. Another disadvantage associated with conventional techniques is that flow control measures need to be implemented because the source of the cool air remains pressurized, and the cool air may thus be supplied inadvertently in case of leakage.

Accordingly, there exists a need for an improved cooling system.

SUMMARY

In one aspect, there is provided a turbine case cooling system for a gas turbine engine having a turbine, a bypass duct, and a longitudinal center axis, the turbine case cooling system comprising: a turbine case at least partially enclosing the turbine and having a turbine case cooling manifold, the turbine case cooling manifold radially inwardly spaced from the bypass duct; and a cooling conduit communicating between an inlet in fluid communication with the bypass duct and an outlet in fluid communication with the turbine case cooling manifold, the conduit having a conduit axis extending between the inlet and the outlet, the conduit axis perpendicular to the longitudinal center axis of the gas turbine engine; an ejector section of the cooling conduit disposed downstream of the inlet, the ejector section in use supplying a motive air flow radially into the cooling conduit to draw a bypass air flow from the bypass duct into the cooling conduit via the inlet, the motive air flow mixing with the bypass air flow to form the cooling gas flow in the conduit; and a diffuser section of the cooling conduit disposed downstream of the ejector section and extending along a diffuser length of the conduit between the ejector section and the outlet, the diffuser section defining a gas flow path through the conduit and in use conveying the cooling gas flow toward the outlet, the diffuser section increasing in cross-sectional area along the diffuser length.

In another aspect, there is provided a method for supplying a cooling gas flow to a turbine case cooling manifold to cool a turbine case of a gas turbine engine having a bypass duct and a longitudinal center axis, the method comprising: supplying a motive air flow to an inlet of a cooling conduit, the motive air flow being supplied radially into the inlet; drawing a bypass air flow into the cooling conduit from the bypass duct of the gas turbine engine; mixing the motive air flow with the bypass air flow to form the cooling gas flow; and conveying the cooling gas flow along a gas flow path of the cooling conduit in a direction substantially perpendicular to the center axis of the gas turbine engine, the cooling gas being conveyed to the turbine case cooling manifold to cool the turbine case.

In a further aspect, there is provided a fluid conduit for a gas turbine engine having a manifold, a gas supply duct, and a longitudinal center axis, the fluid conduit comprising: an inlet communicating with the gas supply duct, and an outlet communicating with the manifold; an ejector section disposed downstream of the inlet, the ejector section in use supplying a motive air flow radially into the fluid conduit to draw a bypass air flow from the gas supply duct into the fluid conduit via the inlet, the motive air flow mixing with the bypass air flow to form a cooling gas flow; and a diffuser section disposed downstream of the ejector section and extending along a diffuser length between the ejector section and the outlet, the diffuser section defining a conduit axis along the diffuser length perpendicular to the center axis of the gas turbine engine, the diffuser section in use conveying the cooling gas flow toward the outlet and increasing in cross-sectional area along the diffuser length.

DESCRIPTION OF THE DRAWINGS

Reference is now made to the accompanying figures in which:

FIG. 4 is a cross-sectional view of the cooling system of FIG. 3, taken along an axis of a cooling conduit shown as line IV-IV in FIG. 3; and FIG. 5 is a block diagram of a method for supplying a cooling gas flow, according to another embodiment.

DETAILED DESCRIPTION

Figure 1:
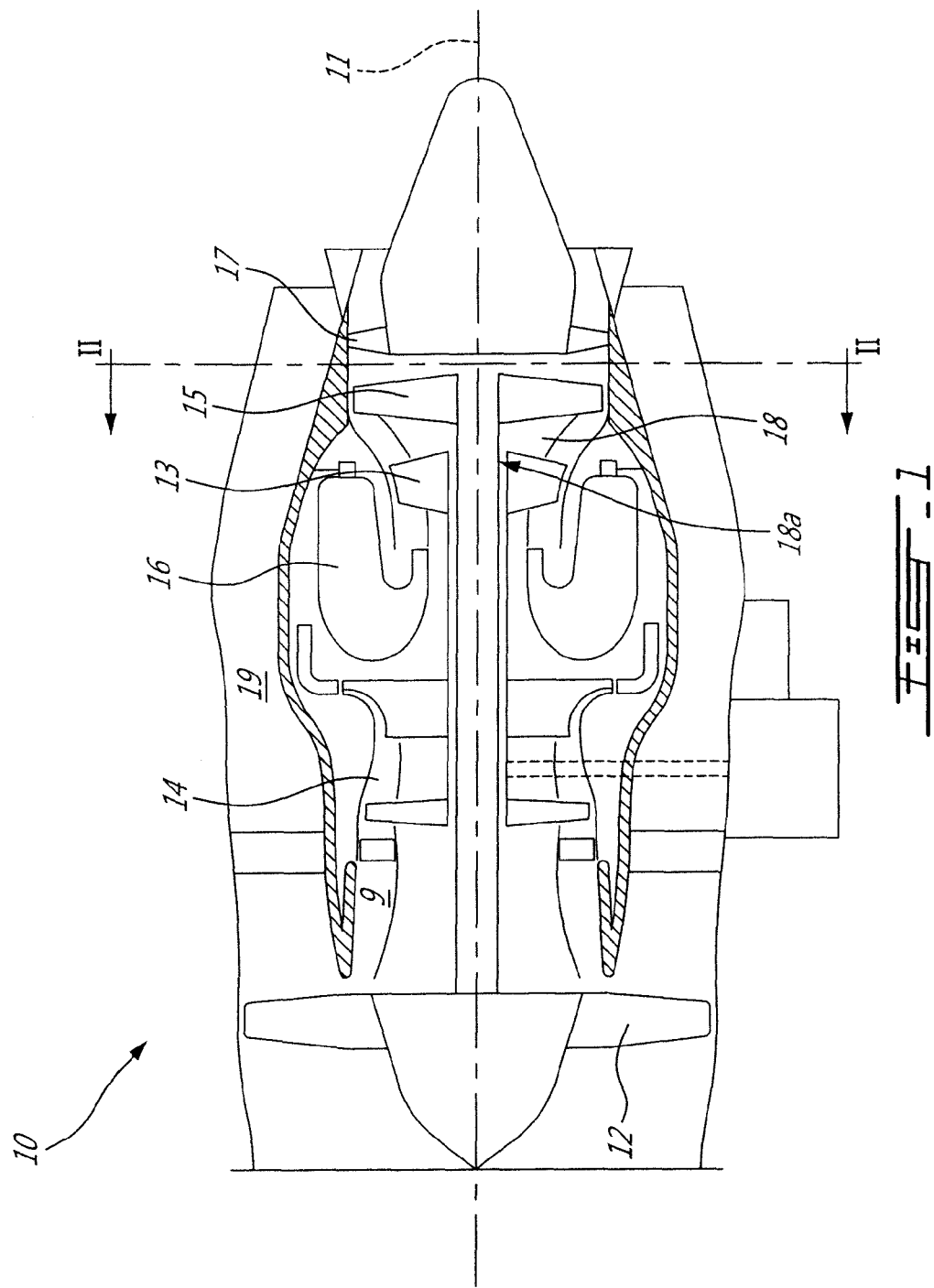
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12 propels the ambient air through an inner core 9 of the engine 10, and an outer bypass duct 19. The turbine section 18 can have a turbine or turbine core 18a which can have a high pressure turbine (HPT) 13 and a low pressure turbine (LPT) 15, both of which are housed or enclosed by a turbine casing or case 17. A longitudinal center axis 11 of the gas turbine engine 10 is also shown.

Figure 2:
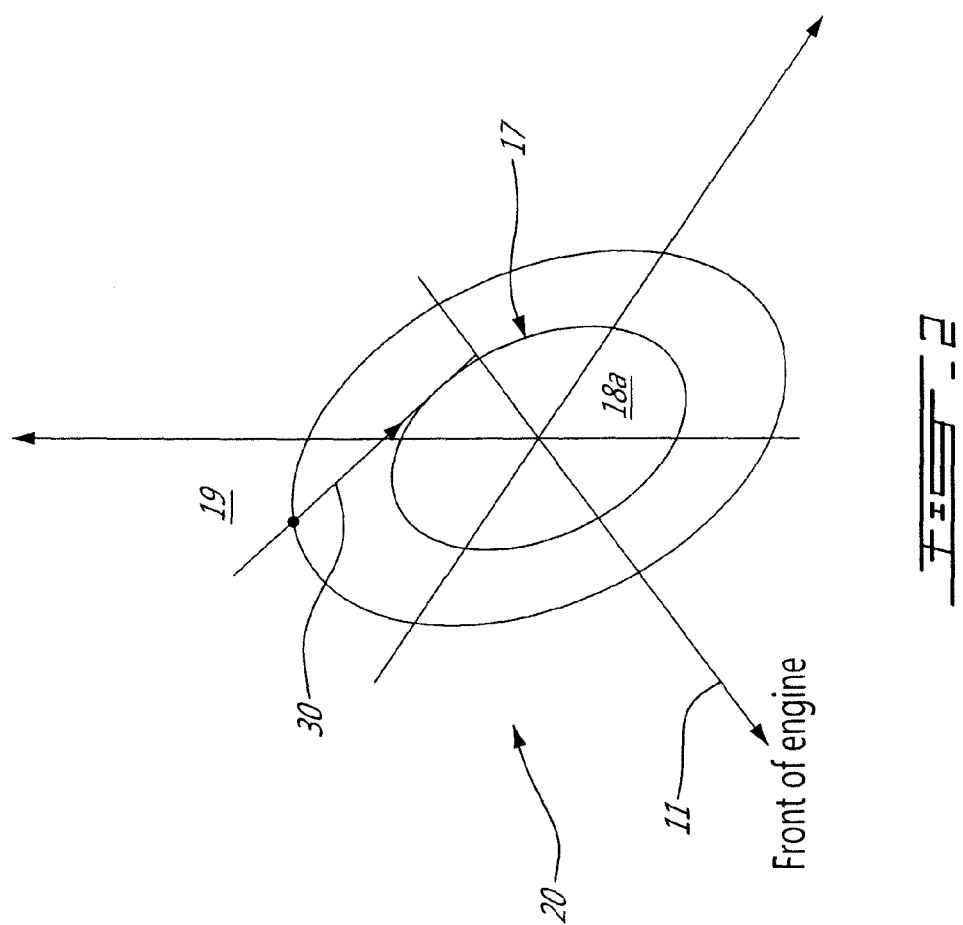
FIG. 2 is a perspective cross-sectional view of a plane of the gas turbine engine of FIG. 1, taken along the plane II-II of FIG. 1.
Figure 3:
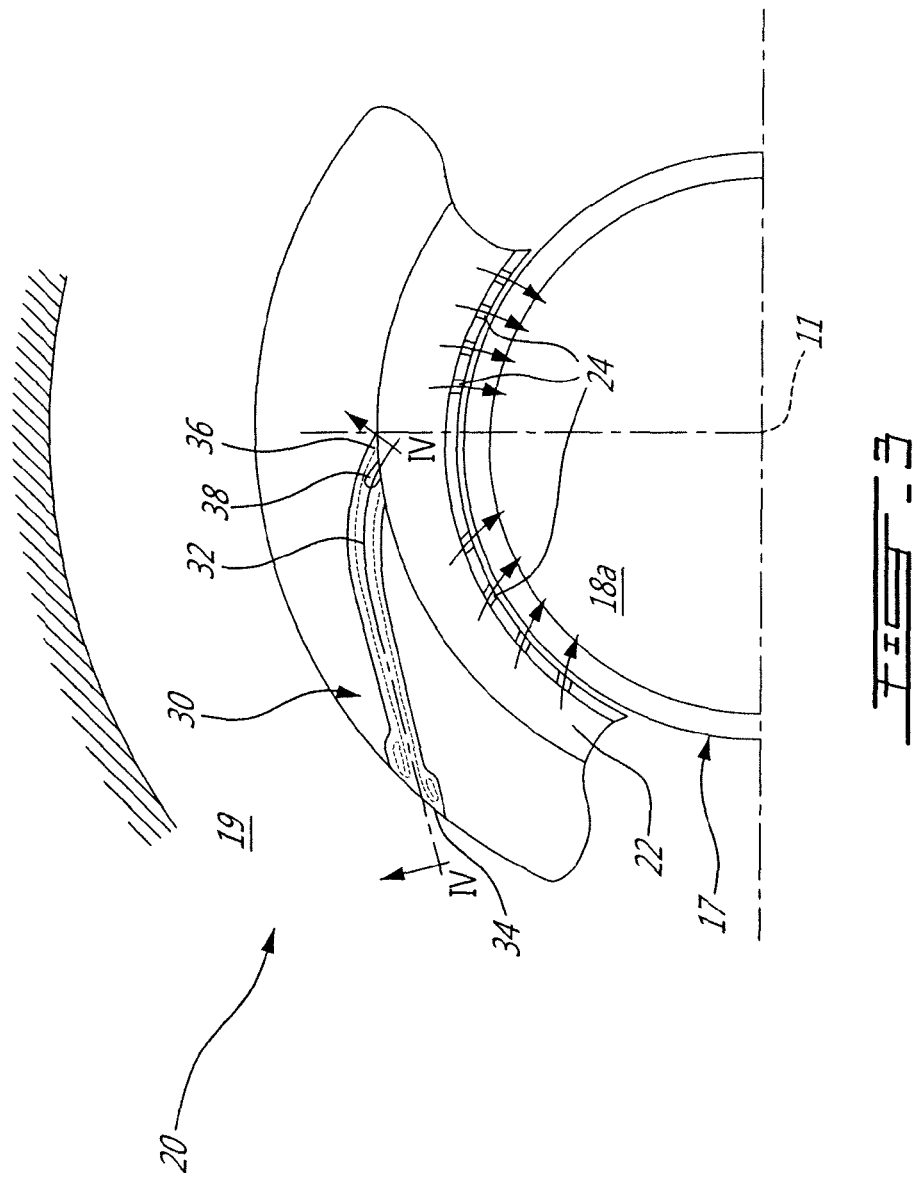
FIG. 3 is a partial cross-sectional view of the gas turbine engine of FIG. 1 showing a cooling system according to an embodiment of the present disclosure.

Of particular interest to the present disclosure, and with reference to FIGS. 1 to 3, is a cooling system 20 for cooling a part of the gas turbine engine 10, such as a turbine case 17. The proximity of the turbine case 17 to the working components of the turbine core 18a results in a significant heating of the turbine case 17. The cooling system 20 allows for the continuous regulation of the temperature of the turbine case 17, thus helping to maintain a control operational clearance between the turbine rotor blades of core 18a and the turbine case 17. In so doing, the cooling system 20 helps to maintain the optimum efficiency of the engine core 18a. The cooling system 20 includes the turbine case 17 and one or more cooling conduits 30, both of which will now be discussed in greater detail.

The turbine case 17 encloses some (or all) of the turbine core 18a and separates it from the other components of the engine 10. Referring to FIG. 3, the turbine case 17 can have a turbine case cooling manifold 22 (or simply "cooling manifold 22"), which is located radially inward from the bypass duct 19. The cooling manifold 22 can be any chamber which surrounds or envelops the turbine case 17, and which can be used for distributing a cooling gas flow to the turbine case 17, thereby cooling the turbine case 17 and helping to maintain optimum clearance with the rotating components of the HPT 13 and LPT 15. One or more cooling manifolds 22 can be used to cool the turbine case 17. For example, both the HPT 13 and the LPT 15 can each have their own cooling manifold 22.

In some embodiments, the cooling manifold 22 has multiple apertures 24 which are spaced apart through the cooling manifold 22 about its circumference, thus surrounding the turbine case 17. The apertures 24 can distribute the cooling gas flow over the surface of the turbine case 17, thus providing a "showerhead" cooling flow to the turbine case 17.

The cooling gas flow is supplied to the cooling manifold 22 via a longitudinal cooling conduit 30, which will now be described in further detail. The cooling conduit 30 can be any pipe or duct which can convey the cooling gas flow from the bypass duct 19 to the cooling manifold 22. The cooling conduit 30 can be a distinct component from the turbine case 17, or can extend through it. Indeed, in some embodiments, the cooling conduit 30 can be an elongated aperture extending through the turbine case 17. Although shown as substantially cylindrical, it will be appreciated that the cooling conduit 30 can take other shapes.

As seen in FIGS. 3 and 4, the cooling conduit 30 has a conduit axis 32 which extends along the length of the cooling conduit 30, between the inlet and the outlet thereof. In most embodiments, the cooling conduit 30 will be a symmetrical tube, and the conduit axis 32 will therefore extend through the center of the cooling conduit 30 as well. However, the tube forming the cooling conduit 30 may be asymmetrical. For example, it may have a flattened tubular shape. The orientation of the conduit axis 32 will depend on the shape and configuration of the cooling conduit 30. For example, where the cooling conduit 30 is curved along its length, the conduit axis 32 will have the same curvature. The conduit axis 32 is perpendicularly to the center axis 11. In most embodiments, the conduit axis 32 lies in a plane that is substantially perpendicular to the center axis 11 of the gas turbine engine 10. This can be better appreciated with reference to FIGS. 2 and 3. The center axis 11 is shown as extending into and out of the page in FIG. 3 (i.e. along the length of the engine 10), whereas the conduit axis 32 extends left and right on the page (i.e. along the width of the engine 10).

The cooling conduit 30 also has an inlet 34 which is in fluid flow communication with the bypass duct 19 such as to receive bypass air therefrom. The inlet 34 can be flush with a surface of the bypass duct 19 so as to minimize flow disturbances when the fluid enters the inlet 34.

The cooling conduit 30 also has an outlet 36 which is in fluid flow communication with the cooling manifold 22. At the outlet 36, the cooling conduit 30 can extend such that it is substantially tangential to the curvature of the cooling manifold 22, thus helping to convey the cooling gas flow substantially tangentially so as to better distribute it throughout the entire cooling manifold 22. It will be appreciated that the entirety of the cooling conduit 30, and not just the outlet 36, can also extend tangentially to the curvature of the cooling manifold 22. The cooling conduit 30 can also be provided with a bifurcation cone 38 located just upstream of the outlet 36, relative to the flow of air through the cooling conduit 30. The bifurcation cone 38 bifurcates, or splits, the cooling gas flow into two different flows at the outlet 36 of the cooling conduit 30. This may be desirable where the cooling conduit 30 supplies the cooling gas flow to two cooling manifolds 22—one for the HPT 13, and the other for the LPT 15, for example. The bifurcation cone 38 may be symmetric about the conduit axis 32, and extend in an upstream direction along a cone length toward the inlet 34. It will be appreciated that the bifurcation cone 38 can also split the cooling gas flow into more than two different flows, if so required.

Referring now to FIG. 4, the cooling conduit 30 includes, between the inlet 34 and the outlet 36 thereof, an ejector section 40 and a diffuser section 50. The diffuser section 50 is located downstream of the ejector section 40 and receives all airflow therefrom.

The ejector section 40 corresponds to a portion of the cooling conduit 30 where the pressure of the cooling gas flow within the cooling conduit 30 can be raised and combined with other gas flows. The ejector section 40 is positioned immediately downstream of the inlet 34, and in operation, supplies a motive air flow MF radially into the cooling conduit 30. The term "radially" in this context refers to the injection of the motive air flow MF into the body of the cooling conduit 30 along a direction that is substantially perpendicular to the conduit axis 32. The term "motive flow" refers to the ability of the motive air flow MF to draw or entrain a bypass air flow BP from the bypass duct 19, through the inlet 34, and into the cooling conduit 30. Both the motive air flow MF and the bypass air flow BP mix within the cooling conduit 30, thus forming the cooling gas flow CG used to cool the turbine case 17. In most embodiments, the cooler bypass air flow BP makes up a significantly larger portion of the cooling gas flow CG than the warmer motive air flow MF.

The mixing of the motive air flow MF and the bypass air flow BP can occur at an ejector throat 43, which is typically disposed at the location of the smallest cross-sectional area of the ejector section 40. The ejector throat 43 and/or ejector 40 can be positioned, shaped, and sized to provide the cooling gas flow CG downstream at a Mach number between about 0.8 and about 1.0. This specific range of Mach numbers has been found to help to maximise the efficiency of the ejector section 40.

In some embodiments, the ejector section 40 has an annular ejector 42. The annular ejector 42 can be integrated with cooling conduit 30, and can receive its supply of relatively high pressure motive air flow MF from the high pressure compressor or from the plenum surrounding the combustor 16 of the gas turbine engine 10. The motive air flow MF can be brought to the annular ejector 42 using a relatively small-diameter pipe 44, and the flow of the motive air flow MF can be modulated by using suitable flow control devices, such as a valve 47. The valve 47 may be a solenoid valve, allowing a controlled or variable opening in the pipe 44, thus varying the supply of the motive air flow MF to the ejector section 40. Valve 47 may alternatively be an on/off valve. By modulating or throttling the flow of the motive air flow MF, the volume of entrained bypass air flow BP can be controlled, and thus so can the supply of cooling gas flow CG.

The annular ejector 42 can have an outer lip 46 with first and second ends, and an inner lip 48 spaced radially inward toward the conduit axis 32 and also having first and second ends. The distance separating the inner and outer lips 48,46 forms a plenum or ejector volume having a substantially annular shape and extending circumferentially around the ejector section 40. The first ends of the inner and outer lips 48,46 are joined together, while the second ends of the lips 48,46 are spaced apart. The distance between the second ends of both lips 48,46 forms a convergent annular outlet, or ejector nozzle 41, through which the motive air flow MF is supplied to the body of the cooling conduit 30.

In some embodiments, the inner lip 48 has a curved profile and is symmetric about the conduit axis 32. The curved profile can be defined as curving upwardly towards the outer lip 46, and can take the form of Bernoulli's lemniscate. The curved profile can also be defined by its distance from the conduit axis 32. For example, the distance from the conduit axis 32 can be greatest at the second end of the inner lip 48, and can decrease in the direction of the first end until it obtains a constant value, at which point the curved profile assumes a flat profile.

Turning now to the diffuser section 50 of the cooling conduit 30, the diffuser section 50 is an expanding conduit which diffuses the cooling gas flow CG along a length DL of the diffuser. In so doing, the diffuser section 50 slows the velocity of the cooling gas flow CG, thus lowering its kinetic energy, and simultaneously raises the pressure of the cooling gas flow CG and its potential energy. The diffuser section 50 can achieve this increase in pressure by expanding along the diffuser length DL, which refers to the increase in its cross-sectional area along the diffuser length DL.

The diffuser section 50 is located downstream of the ejector section 40, in a direction toward the outlet 36. The diffuser section 50 extends along its diffuser length DL between the ejector section 40 and the outlet 36, and receives the cooling gas flow CG from the ejector section 40. The diffuser section 50 defines a gas flow path along which the cooling gas flow CG is conveyed from the ejector section 40, through the diffuser section 50, and through the outlet 36. The orientation of the gas flow path, and thus the orientation of the direction along which the cooling gas flow CG is conveyed, is substantially perpendicular to the center axis 11 of the gas turbine engine 10. In the embodiment of FIG. 4, this direction is along the conduit axis 32, which is transverse or normal to the longitudinal center axis 11.

The expansion of the diffuser section 50 in the direction of the outlet 36 can vary. In most embodiments, the wall 52 of the diffuser section 50 forms a diffuser angle θ with respect to the conduit axis 32 between about 8° and about 11°. The selected diffuser angle θ can affect other parameters of the diffuser section 50, such as its length and diameter. For example, varying the diffuser angle θ can affect the diffuser length DL required to achieve the same performance characteristics, and thus the diffuser length DL can be a function of the diffuser angle θ.

In light of the preceding, it can be appreciated that the cooling conduit 30 disclosed herein may require relatively small piping and control valves, in some cases about four to five times smaller than conventional technology. Furthermore, the orientation and disposition of the inlet 34 may avoid perturbing either the flow of air in the bypass duct 19, or the flow through the engine core 18a. The cooling conduit 30 can also help to ensure that the bypass air flow has substantially the same static pressure as present in the cooling manifold 20, which can in turn help to ensure that no cooler bypass air flow is supplied inadvertently in case of a disruption in the supply of the motive air flow. Further generally, the overall cooling conduit 30 may be more compact, lighter, and more tolerant to degradation than existing technology.

There is also provided a method for supplying a cooling gas flow to a turbine case manifold of a gas turbine engine. The method 100 is schematically represented in FIG. 5.

The method 100 involves supplying a motive air flow to the inlet of the cooling conduit, shown as 102. The motive air flow can be supplied by an ejector section, such as the one described above, and is supplied radially into the inlet. In some embodiments, the motive air flow expands supersonically through the ejector nozzle into the cooling conduit as it turns over the inner lip 48. Such an expansion can help to ensure increased energy extraction from the motive air flow, and may also speed the mixing of the motive air flow with the bypass air flow. The expansion may also energize the boundary layer of the cooling gas flow at the entrance of the diffuser section.

The method 100 also involves drawing the bypass air flow into the cooling conduit from the bypass duct, shown as 104. As previously explained, this can involve entraining the bypass air flow with the motive air flow supplied by the ejector section. The term "entraining" refers to the process by which the bypass air flow is brought by, or carried through, the inlet because of the low pressure region created by the supply of the motive air flow.

The method 100 also involves mixing the motive air flow with the bypass air flow, shown as 106. This mixing forms the cooling gas flow used to cool the turbine case, and can be performed inside the cooling conduit near the ejector section. This may involve providing the cooling gas flow downstream of the ejector throat at a Mach number between about 0.8 and about 1.0, which can help to ensure maximum efficiency for the ejector section.

The method 100 also involves conveying the cooling gas flow along the gas flow path, shown as 108. The cooling gas flow is conveyed in a direction that is substantially perpendicular to the center axis of the gas turbine engine, and is conveyed to the turbine case cooling manifold so as to cool the turbine case. The cooling gas flow can be diffused by a diffuser section as it is conveyed so as to increase its static pressure. In some embodiments, the cooling gas flow is conveyed in the diffuser section upstream of the bifurcation cone at a Mach number below about 0.2, which can help to reduce pressure losses in the diffuser section.

It will be appreciated that the elements of the above-described method can be varied or interchanged without departing from the scope of the present disclosure.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A turbine case cooling system for a gas turbine engine having a turbine, a bypass duct, and a longitudinal center axis, the turbine case cooling system comprising:

a turbine case at least partially enclosing the turbine and having a turbine case cooling manifold, the turbine case cooling manifold radially inwardly spaced from the bypass duct; and a cooling conduit communicating between an inlet in fluid communication with the bypass duct and an outlet in fluid communication with the turbine case cooling manifold, the conduit having a conduit axis extending between the inlet and the outlet, the conduit axis perpendicular to the longitudinal center axis of the gas turbine engine, the turbine case cooling manifold including a plurality of apertures spaced apart about a circumference of the turbine case cooling manifold, the apertures in use showering the cooling gas flow against the turbine case;

an ejector section of the cooling conduit disposed downstream of the inlet, the ejector section in use supplying a motive air flow radially into the cooling conduit to draw a bypass air flow from the bypass duct into the cooling conduit via the inlet, the motive air flow mixing with the bypass air flow to form the cooling gas flow in the conduit; and a diffuser section of the cooling conduit disposed downstream of the ejector section and extending along a diffuser length of the cooling conduit between the ejector section and the outlet, the diffuser section defining a gas flow path through the conduit and in use conveying the cooling gas flow toward the outlet, the diffuser section increasing in cross-sectional area along the diffuser length.

2. The cooling system as defined in claim 1, wherein the ejector section has an annular ejector having an outer lip with first and second ends and an inner lip spaced radially inward from the outer lip and having first and second ends, the spaced apart inner and outer lips defining an annular ejector volume therebetween.

3. The cooling system as defined in claim 2, wherein the first ends of the inner and outer lips are joined together, and the second ends of the inner and outer lips are spaced apart and define an ejector nozzle in use supplying the motive air flow.

4. The cooling system as defined in claim 2, wherein the inner lip is symmetric about the conduit axis and has a curved profile, the inner lip curving toward the outer lip.

5. The cooling system as defined in claim 2, wherein the inner lip has a curved profile in the form of Bernouilli's lemniscate.

6. The cooling system as defined in claim 1, wherein at least at the outlet, the conduit axis of the cooling conduit is substantially tangential to a curvature of the turbine case cooling manifold.

7. The cooling system as defined in claim 1, wherein the ejector section has an ejector throat positioned, shaped, and sized to in use provide the cooling gas flow at a Mach number between 0.8 and 1.0.

8. The cooling system as defined in claim 1, wherein the cooling conduit has a bifurcation cone disposed at the outlet and symmetric about the conduit axis, the bifurcation cone extending along a cone length into the gas flow path toward the inlet.

9. The cooling system as defined in claim 1, wherein the diffuser section increases in cross-sectional area along the diffuser length at a diffuser angle between 8° and 11° with respect to the conduit axis.

10. The cooling system as defined in claim 1, wherein the inlet is substantially flush with a surface of the bypass duct.

11. A method for supplying a cooling gas flow to a turbine case cooling manifold to cool a turbine case of a gas turbine engine having a bypass duct and a longitudinal center axis, the method comprising:

supplying a motive air flow to an ejector located downstream of an inlet of a cooling conduit, the motive air flow being supplied radially into the ejector and the inlet;

drawing a bypass air flow into the cooling conduit from the bypass duct of the gas turbine engine using the ejector driven by the motive air flow;

mixing the motive air flow with the bypass air flow within the cooling conduit to form the cooling gas flow; and conveying the cooling gas flow along a gas flow path of the cooling conduit, in a direction substantially perpendicular to the center axis of the gas turbine engine, while diffusing the cooling gas flow along the cooling conduit, and conveying the cooling gas to the turbine case cooling manifold, the turbine case cooling manifold including a plurality of apertures spaced apart about a circumference of the turbine case cooling manifold, and showering the cooling gas over the turbine case via the plurality of apertures in the turbine case cooling manifold.

12. The method as defined in claim 11, wherein supplying the motive air flow comprises expanding supersonically the motive air flow into the inlet of the cooling conduit.

13. The method as defined in claim 11, wherein conveying the cooling gas flow comprises conveying the cooling gas flow substantially tangentially to a curvature of the turbine case cooling manifold.

14. The method as defined in claim 11, wherein mixing the motive air flow with the bypass air flow comprises providing the cooling gas flow at a Mach number between 0.8 and 1.0.

15. The method as defined in claim 11, wherein conveying the cooling gas flow further comprises splitting the cooling gas flow into separate gas flow paths.

16. The method as defined in claim 15, wherein conveying the cooling gas flow further comprises conveying the cooling gas flow at a Mach number below 0.2 upstream of the separate gas flow paths.

* * * * *